United States Patent
Hintermeister et al.

(10) Patent No.: US 9,699,114 B1
(45) Date of Patent: Jul. 4, 2017

(54) PROVIDING USE OF LOCAL OR PRIVATE CLOUD INFRASTRUCTURE RESOURCES TO PUBLIC CLOUD PROVIDERS

(71) Applicant: International Business Machines Corporation, Armonk, NY (US)

(72) Inventors: Gregory R. Hintermeister, Rochester, MN (US); Matthew G. Kelm, Rochester, MN (US); Christopher E. Sharp, Winchester (GB); Jason B. Smith, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/335,925

(22) Filed: Oct. 27, 2016

(51) Int. Cl.
| | | |
|---|---|---|
| *H04L 12/927* | (2013.01) | |
| *H04L 29/08* | (2006.01) | |
| *H04L 12/46* | (2006.01) | |
| *H04L 12/24* | (2006.01) | |

(52) U.S. Cl.
CPC ........ *H04L 47/805* (2013.01); *H04L 12/4641* (2013.01); *H04L 41/5029* (2013.01); *H04L 67/10* (2013.01)

(58) Field of Classification Search
CPC .............. H04L 47/805; H04L 12/4641; H04L 41/5029; H04L 67/10
See application file for complete search history.

(56) References Cited

U.S. PATENT DOCUMENTS

| | | | |
|---|---|---|---|
| 9,009,294 B2 | 4/2015 | Dawson et al. | |
| 9,015,324 B2 | 4/2015 | Jackson | |
| 2003/0212887 A1* | 11/2003 | Walther | ................. H04L 63/08 713/151 |
| 2016/0373405 A1* | 12/2016 | Miller | ................. H04L 63/0236 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
Disclosed Anonymously. (2014) Method and Apparatus for Partitioning Applications for the Interoperability Enablement of Hybrid (Public and Private) Cloud. IP.co, Prior Art Database Technical Disclosure, IPCOM000235888D.

* cited by examiner

*Primary Examiner* — Arvin Eskandarnia
(74) *Attorney, Agent, or Firm* — Heslin Rothenberg Farley & Mesiti P.C.

(57) ABSTRACT

A method, computer program product, and system performing a method that includes a processor(s) of a local/private computing system (LPCS) receiving, via a public computing system and a communication network, on behalf of a user of the public computer system, a request to use computing resource(s) belonging to the LPCS. The processor(s) determine a set of usage parameters comprising a first usage limitation, with the first usage limitation including a first limitation type and first limitation value, and with the first usage limitation defining a limit on usage of the computing resource(s) on behalf of the user. The processor(s) receives, via the public computing system and the communication (Continued)

network, a workload of the user. The processor(s) processes the workload, which includes the processor limiting, by machine logic, usage of the resources(s), on behalf of the user, in accordance with the usage parameters.

16 Claims, 6 Drawing Sheets

PROVIDING USE OF LOCAL OR PRIVATE CLOUD INFRASTRUCTURE RESOURCES TO PUBLIC CLOUD PROVIDERS

BACKGROUND

Public clouds are distributed computing systems where the cloud infrastructure is made available to the general public or a large industry group and the distributed computing system is typically owned by an organization selling cloud services. Public clouds allow users to share resources and applications in accordance with the scale of the use of each user. Because a public cloud typically serves many independent user entities, public cloud is a "multi-tenant environment." Typically, in a public cloud, a single architecture hosts multiple customers' applications and data. A public cloud is one type of "public computer system." Public computer systems directly solicits usage from at least a substantial portion of the general public (for example, directly solicits usage by anybody in a large industry group that includes many companies and individuals). Typically, a public computer system user must authenticate in some manner before a session that uses computing resources of the public computer system.

A "private cloud" is different than a public cloud. A private cloud is a term for a cloud infrastructure that is operated primarily to serve the computing needs of a single entity (for example, an individual, a company, a charitable organization). Resources utilized in a private cloud can be deployed internally. As such, rather than running web-based and rich client applications over the Internet, a private cloud can employ cloud computing within a company's own local or wide area networks. When the resources of a private cloud are located localized in this manner, the private cloud can be referred to as a "local cloud." The term implies that the same virtualization and highly flexible and scalable methods used in huge Internet-based datacenters are also used in the private clouds in the enterprise. A cloud which is local and/or private is herein referred to as a "private/local cloud" or a "local/private cloud" (LPC). An LPC is one type of "local/private computer system." Local/private computer systems (LPCSs) do not directly solicit usage by any substantial segment of the public. Typically, an LPCS user must authenticate a user in some manner before initiating a session that uses computing resources of the LPCS.

Sharing of resources of the public cloud becomes problematic when a customer monopolizes the resources, including but not limited to, bandwidth, disk I/O, CPU and other resources. The user who monopolizes is often referred to as a "noisy neighbor" and this user's behavior can negatively affect the performance of the cloud resources utilized by other users. A condition called "the noisy neighbor effect" occurs when an application or virtual machine uses the majority of available resources and causes network performance issues for others on the shared infrastructure. The noisy neighbor effect causes other virtual machines and applications that share the infrastructure to suffer from uneven cloud network performance. A lack of bandwidth is one cause of network performance issues and because bandwidth carries data throughout a network, when one application or instance uses too much, other applications suffer from slow speeds and/or latency.

To avoid the potential of this noisy neighbor effect, certain customers will utilize dedicated resources in a public cloud. In other words, a dedicated set of resources is "partitioned" to a respective public cloud customer, for example, by a resource management mechanism in the cloud. Alternatively, customers with potentially resource-intensive computing needs will use private computing environments, including proprietary distributed computing environments, such as private clouds. The users who are allocated dedicated resources in a public cloud can depend on consistent performance. But as a result of dedicating the partitioned sets of resources exclusively to these users, these dedicated resources are dormant when the corresponding the users are not computationally active.

SUMMARY

Shortcomings of the prior art are overcome and additional advantages are provided through the provision of a computer program product for use with a public computer system and a local/private computer system (LPCS). The computer program product comprises a storage medium readable by a processing circuit and storing instructions for execution by the processing circuit for performing a method. The method includes, for instance: receiving, via a public computing system and a communication network, on behalf of a user of the public computer system, by one or more processors of a local/private computing system (LPCS), a request to use one or more computing resources belonging to the LPCS; responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user; receiving, via the public computing system and the communication network, by the one or more processors, a workload of the user; and processing, by the one or more processors, the workload, wherein the processing comprises limiting, by machine logic, usage of the one or more computing resources, on behalf of the user, in accordance with the usage parameters.

Shortcomings of the prior art are overcome and additional advantages are provided through the provision of a method for use with a public computer system and a local/private computer system (LPCS). The method includes, for instance: receiving, via a public computing system and a communication network, on behalf of a user of the public computer system, by one or more processors of a local/private computing system (LPCS), a request to use one or more computing resources belonging to the LPCS; responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user; receiving, via the public computing system and the communication network, by the one or more processors, a workload of the user; and processing, by the one or more processors, the workload, wherein the processing comprises limiting, by machine logic, usage of the one or more computing resources, on behalf of the user, in accordance with the usage parameters.

Shortcomings of the prior art are overcome and additional advantages are provided through the provision of a system for use with a public computer system and a local/private computer system (LPCS). The system includes a memory, one or more processor in communication with the memory, and program instructions executable by the one or more processor via the memory to perform a method. The method includes, for instance: receiving, via a public computing system and a communication network, on behalf of a user of the public computer system, by one or more processors of a local/private computing system (LPCS), a request to use one or more computing resources belonging to the LPCS; responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user; receiving, via the public computing system and the communication network, by the one or more processors, a workload of the user; and processing, by the one or more processors, the workload, wherein the processing comprises limiting, by machine logic, usage of the one or more computing resources, on behalf of the user, in accordance with the usage parameters.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects. For example, in an embodiment of the present invention, the usage on behalf of the processing of the workload is performed in a manner such that the user is not made aware that the user has used the one or more computing resources.

In an embodiment of the present invention, the first limitation type is selected from the group consisting of: a processing power limitation, a storage limitation, a volatile memory limitation, a limit on number of physical machines, a limit on number of virtual machines, a limit on applications, a limit on number of communications, a time limitation, a limit on identities of devices allowed to communicate with the one or more computing resources, and a limit on data volume in communications.

In an embodiment of the present invention, the public computer system directly solicits usage from at least a substantial portion of the public, and the LPCS does not directly solicit usage from any substantial portion of the public. In an embodiment of the present invention, the user is not authorized to access the one or more resources by connecting to the LPCS directly.

In an embodiment of the present invention, the set of usage parameters further comprise a second usage limitation defining connectivity information for the public computing system to utilize when connecting to the LPCS for processing the workload, the method further comprising: transmitting, by the one or more processors, to the public computing system, the second usage limitation. In another aspect of this embodiment, the receiving further comprises: receiving, via the public computing system and the communication network, by the one or more processors, the connectivity information; and authorizing, by the one or more processors, the one or more computing resources to process the workload. This method may also further comprise: establishing, by the one or more processors, based on the connectivity information, a data communication connection for use by the user to connect to the one or more computing resources through the public computing system. In an embodiment of the present invention, the data communication connection is selected from the group consisting of: a virtual private network and virtual local area network spanning. In another embodiment, the connectivity information is selected from the group consisting of: user authentication scheme information, application program interface call information, image repository link information, and characteristics information and network information associated with the one or more computing resources.

In an embodiment of the present invention, receiving a workload of the user comprises: obtaining, by the one or more processors, from the user, via the public computing system and the communication network, a custom image; and installing, by the one or more processors, the custom image to create the workload on the LPCS.

In an embodiment of the present invention, receiving a workload of the user comprises: copying, by the one or more processors, from the public computing system, over the communication network, an image, based on metadata associated with the image indicating a designation of the image by the user; and installing, by the one or more processors, the image to create the workload on the LPCS.

In an embodiment of the present invention, the first usage limitation is selected from the group consisting of: a Service Level Agreement associated with the one or more computing resources, quality criteria defining performance parameters of the one or more computing resources, and financial terms defining cost associated with utilization of the one or more computing resources by the public computing system.

In an embodiment of the present invention, the set of usage parameters further comprise a second usage limitation, the second usage limitation identifying at least one specific resource in the LPCS that corresponds to a portion of the one or more resources in the request, and wherein the processing comprises utilizing the at least one specific resource to process a portion of the workload.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
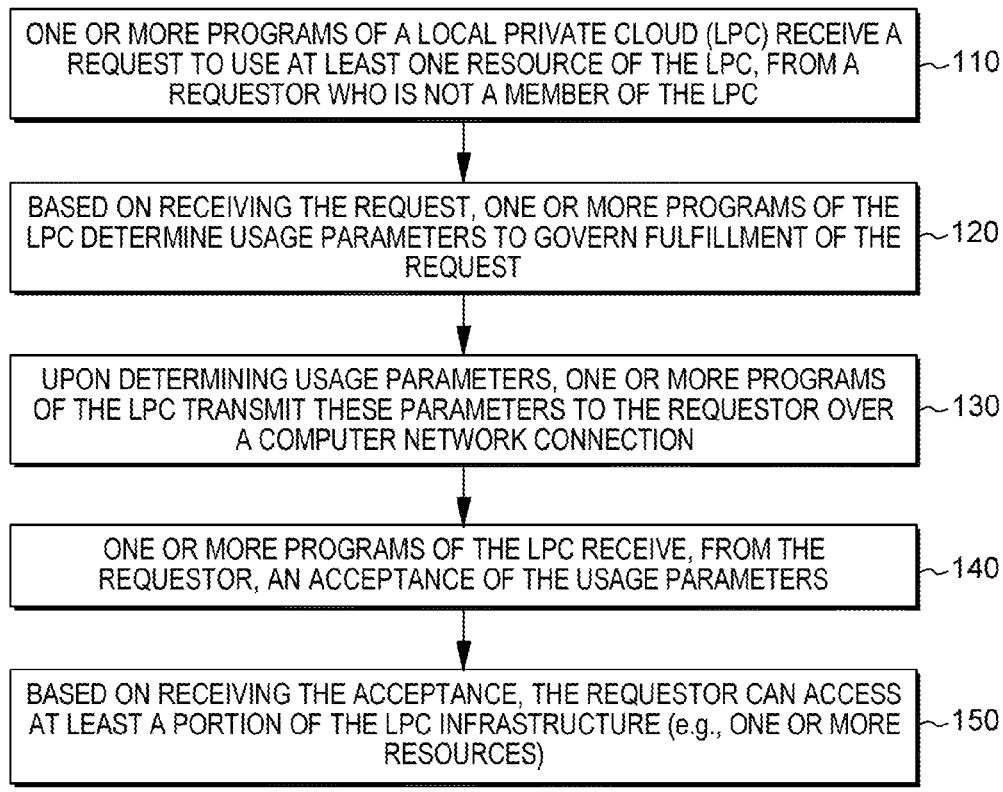
FIG. 1 depicts a workflow associated with aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. The terms program and program code are used to represent one or more programs executing on one or more processing resources of a computing system.

As referred to throughout this application, the term infrastructure refers to computing resources of a given computing environment, such as a public and/or LPC computing environment. Computing resources that comprise the infrastructure of a computing environment include, but are not limited to, servers (e.g., physical servers that are utilized as host machines for guests, virtual machines (VMs)), virtualization technologies (i.e., technologies that abstract physical elements and location and present servers, applications, desktops, storage, and networking that is uncoupled from physical devices and presented as logical resources), storage (e.g., storage area networks, network attached storage (NAS), and unified systems), networking elements (e.g., switches to interconnect physical servers and storage), infrastructure management (e.g., server, network, and storage orchestration, configuration management, performance monitoring, storage resource management, and usage metering), applications, and/or infrastructure systems (e.g., pre-integrated software and hardware).

Both LPCs and public clouds face issues related to efficient utilization of their resources. When an organization is not taking advantage of the resources in the LPC, the computing capacity of these cloud resources is not realized. Meanwhile, a public cloud may often operate at or close to capacity because of its accessibility to a larger user base. When customers of the public cloud require dedicated resources, which are not available to other users of the cloud, resources that could otherwise help accommodate the computing demands of other users, remain dormant.

Expanding the capacity of the public cloud may not be the most efficient approach to meeting computing demands because the need for resources can vary over time. Thus, investing in additional resources to augment a cloud may result in an expensive investment that is not utilized efficiently. Rather, a flexible approach that enables a public cloud to take advantage of underutilized resources on a temporary or as-needed basis, without changing the infrastructure of the public cloud itself, presents a more cost-effective and efficient approach to the temporal requirements for cloud resources.

In embodiments of the present invention, cloud resources become a utility: private capacity can be utilized by public cloud providers and their public cloud users. Embodiments of the present invention expand the capacity of public clouds on a temporary (and automatic) basis by enabling the public cloud provider to take advantage of unused resources from a LPC, and to offer these resources to users of the public cloud. This aspect enables public cloud providers to offer users more infrastructure options. Embodiments of the invention also benefit LPC owners by giving them a way to offer dormant infrastructure for utilization by public cloud users, at a financial benefit to the owners. Embodiments of the present invention can be analogized with the sharing economy of solar panels, as homes with solar panels can give back electricity for credit into the electrical grid. Alternatively, prominent ecommerce websites allow individual sellers to utilize their electronic marketplaces in exchange for a percentage of the profits of the resultant sales.

Aspects of embodiments of the present invention enable local or dedicated cloud owners to provide portions of these local or dedicated cloud to public cloud providers. Certain embodiments of the present invention may enable a cloud owner to maintain a certain level of control over resources offered for the use of the public cloud and its users, including: 1) identifying portions of clouds to provide to a public cloud; 2) setting for users (and the cloud provider) quality and service level agreement (SLA) criteria to govern a resource commitment; 3) specifying billing details; and 4) designating a purpose for the provided infrastructure (e.g., offering the designated resources to users accessing the public cloud from developing countries).

Aspects of embodiments of the present invention represents improvements to existing computing technology and are inextricably tied to computing. For example, embodiments of the present invention provide additional resource capacity to public clouds that public cloud providers can automatically provision when the resources of the public cloud itself are at a deficit in comparison with the demand. In an embodiment of the present invention, the public cloud provider can automatically provision resources that meet SLA criteria for public cloud users. This sharing of infrastructure seamlessly the computing demands of public cloud users, while maintaining the security and meeting the computing requirements.

The implementation of certain aspects of the present invention also provide certain economic advantages. For example, to incentivize resource sharing with public clouds, a public cloud provider may offer a discount to the LPC owner, as the owner makes resources of its local/gives back infrastructure to the public cloud provider's marketplace. Sharing of resources with the public cloud can be further incentivized; for example, a public cloud provider may offer revenue for the LPC owner as the public cloud providers charges its users to utilize the LPC infrastructure, minus, for example, a percentage (e.g., 30%) taken from the public cloud marketplace. Aspects of embodiments of the present invention ensure that unused capacity is not wasted and the world-wide private capacity is shared at a discount, for those that want to run workloads, but may not be able to afford regular cloud computing resource utilization prices.

Some embodiments of the present invention may include one, or more, of the following operations, characteristics, features and/or advantages: (i) for use with a first cloud including a plurality of available cloud computing resources and a second cloud controlled by a second cloud controller: (ii) receiving, by the second cloud controller, a request to allow access to the first cloud to a plurality of end users of the second cloud; (iii) receiving, by the second cloud controller, connectivity information indicative of a manner in which the plurality of end users of the second cloud can make use of the available cloud computing resources of the first cloud; (iv) receiving, by the second cloud controller and from a first end user of the plurality of end users of the second cloud, a request to make use of the available cloud computing resources of the first cloud; (v) setting up, by the second cloud, data communication connections that allow the first end user to make use of the available cloud computing resources of the first cloud through the second cloud based, at least in part, upon the connectivity information; (vi) the first cloud is a private cloud; (vii) the second cloud is a public cloud; (viii) the connectivity information includes the following: user authentication scheme information, API call information, image repository link information, available cloud computing resources characteristics information and network information; (ix) the connectivity information includes pricing information; (x) responsive to the first end user's use of the available cloud computing resources of the first cloud, charging good and valuable consideration to the first end user in accordance with the pricing information; and/or (xi) the data communication connections are of at least one of the following types: virtual private network (VPN) and virtual local area network (VLAN) Spanning.

In an embodiment of the present invention, an LPC provider and/or a manager of computing resources in a distributed computing environment, provides use of infrastructure (that is, computing resources) from the distributed computing environment of the LPC to users of a public cloud. In some embodiments, a public cloud user's use of computing resource(s) of the LPC is limited. Many types of limitations are possible, including but not limited to: (i) processing power limitations for example, CPU cycle limitations, thread limitations); (ii) storage limitations; (iii) limit on number of physical machines used; (iv) limit on number of virtual machines used; (v) limit on what software programs are used; (vi) limit on number of communications made to/from the LPC (for example, limit on transactions per hour); (vii) time limitations (for example, time of day, time of week, time of year) limitations; (viii) limit on identities of devices allowed to communicate with computing resources of the LPC; and (ix) limit on data volume communicated into and/or out of the LPC; (x) volatile memory usage limitation. A limitation will generally have a type and a value. For example a limitation of the volatile memory limitation type may specify that no more than 500 gigabytes of volatile memory can be used. One, or more, usage limitation(s) may be included in a set of usage parameters.

In order to make infrastructure available, in an embodiment of the present invention, one or more computing nodes from an LPC (or an LPCS) connect to one or more computing nodes of a public cloud. This connection can be achieved through a variety of varied communication technologies utilized by computing resources, including but not limited to, connecting over the Internet or another publicly or privately available network connection. Once the LPC and the public cloud (e.g., resources thereof) have established a communication connection, a program executing on one or more processing resources of the LPC transmits a registration request (e.g., over a network connection, including, for example, the Internet) to a program executing on one or more processing resources of the public cloud. The registration request includes a designation of a portion of the LPC infrastructure being offered for registration.

In an embodiment of the present invention, the public cloud receives the registration request from the LPC and registers the designated portion of the LPC infrastructure into the public cloud provisioning catalog. Depending on how the cloud computing manager of the public cloud provisions the newly registered resources, users of the public cloud can utilize these resources in a manner that is either transparent or readily apparent to the user. For example, in an embodiment of the present invention, the cloud computing manager (i.e., program code that manages resource allocation to workloads utilized resources of the cloud) may allocate the LPC resources when activity on the cloud dictates a need for the resources, without notifying the public cloud user that the user's workloads are being processed by LPC resources. Just as a cloud user is generally unaware of what physical resources of a cloud are handling its workloads, the user would not be aware which infrastructure, the public cloud infrastructure or resources in the registered portion of the LPC, were being utilized to run the user's workloads. In another embodiment of the present invention, when user demand exceeds public cloud resources and/or the cloud computing manager determines that utilizing the registered resources, instead of the public cloud resources, would be more efficient or cheaper for a user, a program in the public cloud alerts the user to the opportunity of using registered LPC resources for its workloads. The program may present this option and provide the user with the opportunity to browse parameters of the offered additional resources, including associated SLAs. Based on the user accepting the option to utilize these resources, the cloud computing manager allocates these resources for use in processing the user's workloads.

In a move readily apparent to a user, in an embodiment of the present invention, a program executing on the public cloud can make the registered LPC infrastructure available to public cloud users explicitly, as an alternative to resources of the public cloud. This program connects to the LPC resources and provides these resources (with data and/or applications) for the user to access in connection with utilizing these resources. For example, a program executing on a public cloud resource may allocate some of the registered LPC resources to a user, obtain, from the user, a custom image, and upload the user's custom image to the allocated resources. In another embodiment of the present invention, the program of the public cloud requests that a user select an image from the public cloud resources, copies the selected image to the LPC, and creates a workload on the private cloud. By repurposing an image from the public cloud, the program of the public cloud enable the user to utilize the registered resources of the LPC, just like the user would utilize another region in the public cloud.

As discussed above, a public cloud user's use of computing resource(s) of the LPC infrastructure can be subject to limitations. In an embodiment of the present invention, these limitations are imposed by the LPC when registering its resources for use as extended infrastructure for the public cloud. The registration request sent by an LPC program may include parameters that define utilization of the LPC infrastructure by public cloud users. For example, the request can specify a purpose for which the infrastructure can be utilized, and an SLA that LPC infrastructure will adhere to, once allocated to a public cloud user.

Because registered LPC infrastructure can come with conditions, a program in the public cloud utilizes the parameters defining the conditions to position this infrastructure for consumption by public cloud users. For example, in an embodiment of the present invention, when offering the resources of the registered infrastructure, the provider may specify a price for using the infrastructure that enables the public cloud provider to profit from this arrangement. In the situation where the registered LPC resources have a higher SLA than the resources in the public cloud, not only would the public cloud provider be able to advertise these resources, but the cloud computing manager of the public cloud could allocate the resources to handle user workloads without a concern of not meeting its own SLA standards. Given that the registered resource provide an overflow to the public cloud at a lower cost to the public cloud computing provider than permanently adding resources to the cloud's infrastructure, the cloud computing provider may offer a portion of the registered resources in the private cloud for use by interests that are unable to subscribe to the public cloud, for economic reasons, for example, emerging companies in economically depressed areas. In an embodiment of the present invention, a program executing on the public cloud could identify these interests by identifying users in qualifying locations before allocating the LPC resources to them.

In an embodiment of the present invention, program code from a requestor, including a public cloud, may request to utilize resources of a private computing system, such as a LPC or a LPCS. FIG. 1 is a workflow 100 that illustrates aspects of a process in which an LPC, for example, receives a request for use of computing resources of the LPC. (The LPC is used as an example but this workflow is applicable to any dedicated computing system, such as an LPCS.)

Referring to FIG. 1, in an embodiment of the present invention, program code (i.e., one or more programs) executing on one or more processors of an LPC receives a request to use at least one resource of the LPC, from a requestor who is not a member of the LPC (110). In an embodiment of the present invention, a program executing on a public cloud makes this request.

Returning to FIG. 1, based on receiving the request, a program in the LPC determines usage parameters to govern fulfillment of the request (120). For example, in an embodiment of the present invention, the usage parameters define, at least in part, permitted usage of the requested resource(s). In an embodiment of the present invention, the request for the resource(s) may request the resource(s) by type, performance, or other parameters, but not identify the specific resource(s) of the LPC that would fulfill the request. Thus, a program of the LPC responds to the request with an identity of a resource(s). For example, the usage parameters may identify a specific resource in the LPC infrastructure that satisfies the request. In an embodiment of the present invention, the usage parameters include financial terms relating to exchange of consideration between the LPC owner and the requestor, based on usage of resources of the LPC on behalf of the requestor. In some embodiments of the present invention, the usage parameters include a service level agreement (SLA). The usage parameters may include quality criteria (within an SLA document and/or separately from the SLA).

In an embodiment of the present invention, upon determining usage parameters, a program of the LPC transmits these parameters to the requestor over a computer network connection (130). In an embodiment of the present invention, the program communicates with the requestor over an Internet connection. Although the workflow of FIG. 1 is applicable to any dedicated computing system, because an LPC is used as an example, with this computing system, the program may transmit usage parameters to the requestor that include a set of cloud usage parameter(s).

In an embodiment of the present invention, a program of the LPC receives, from the requestor, an acceptance of the usage parameters (140). Based on receiving the acceptance, the requestor can access at least a portion of the LPC infrastructure (e.g., one or more resources) (150). Thus, in an embodiment of the present invention, a program in the LPC permits access at least some of the dedicated cloud resources, according to the set of usage parameter(s).

Figure 2:
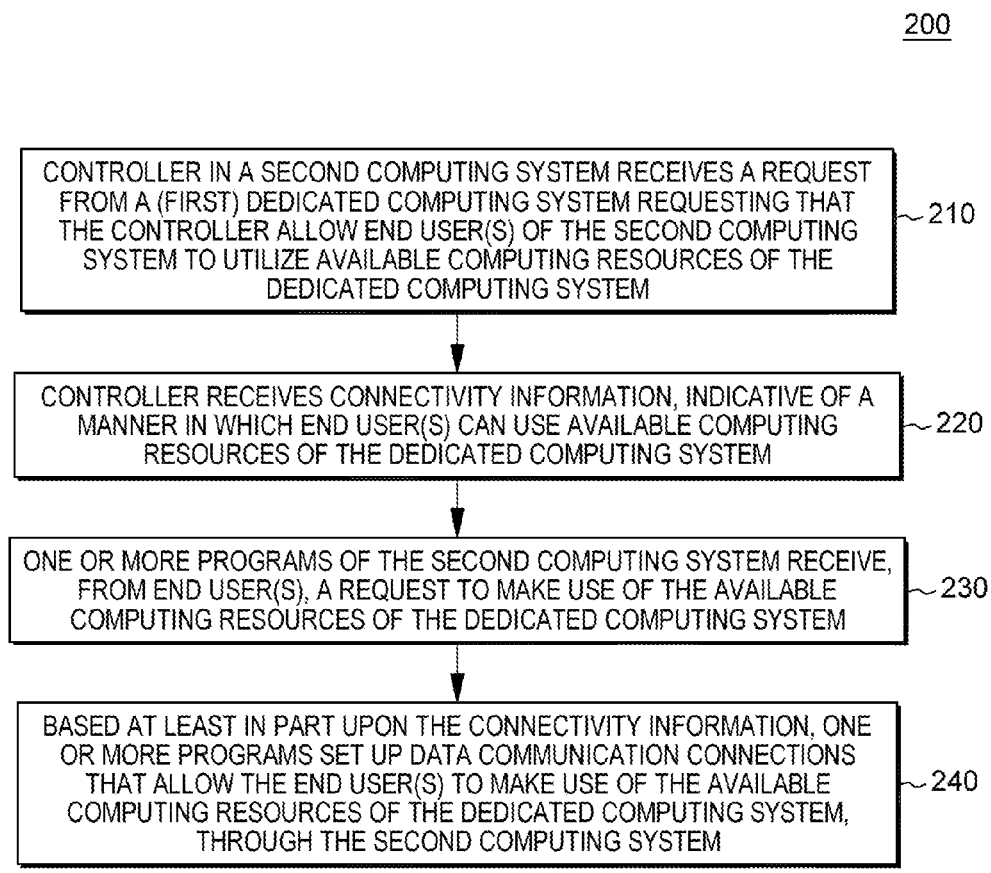
FIG. 2 depicts a workflow associated with aspects of an embodiment of the present invention.

FIG. 2 is a workflow 200 that illustrates aspects of establishing access to a dedicated computing system for users of another computing system. As is explained in more detail below, a user access resources of the dedicated computing system by first accessing the other computing system. For ease of understanding, this "other" computing system is called the "second" computing system in the workflow 200. In an embodiment of the present invention, the dedicated computing system and the second computing system are both cloud computing systems. The dedicated computing system may be a private cloud, which is controlled by a cloud controller, and the second computing system may be a public cloud, which is controlled by a cloud controller. These controllers include one or more programs and the computing hardware for running the program(s).

As seen in FIG. 2, in an embodiment of the present invention, a controller in the second computing system receives a request from the (first) dedicated computing system requesting that the controller allow end user(s) of the second computing system to utilize available computing resources (e.g., infrastructure) of the dedicated computing system (210). In an embodiment of the present invention, the controller receives connectivity information, indicative of a manner in which end user(s) can use available computing resources of the dedicated computing system (220). The connectivity information may include, but is not limited to: user authentication scheme information, API call information, image repository link information, available cloud computing resources characteristics information, and/or network information. The connectivity information may also include pricing information, setting prices for utilization of available resources in the dedicated computing system by users of the second computing system.

In an embodiment of the present invention, a program of the second computing system receives, from end user(s), a request to make use of the available computing resources of the dedicated computing system (230). Based, at least in part upon the connectivity information, the program sets up data communication connections that allow the end user(s) to make use of the available computing resources of the dedicated computing system, through the second computing system (240). In an embodiment of the present invention, the data communication connections are of at least one of the following types: VPN and/or VLAN Spanning. If the connectivity information included pricing information, based on the end user using the available computing resources of the dedicated computing system, a program of the second computing system generates and transmits a bill, or electronically processes a transaction to charge good and valuable consideration to the end user in accordance with the pricing information. As mentioned earlier, the dedicated computer system and the second (e.g., public) can use additional criteria to exclude or enables users to access the available resources of the dedicated computing system, including but not limited to the geographical location of the user.

Figure 3:
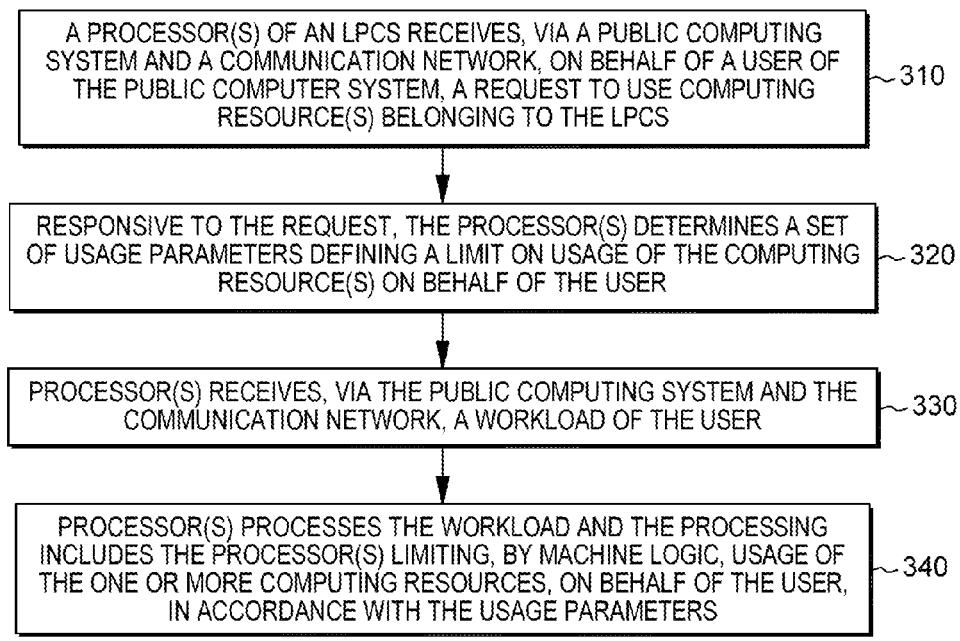
FIG. 3 depicts a workflow associated with aspects of an embodiment of the present invention.

FIG. 3 is a workflow 300 that illustrates various aspects of certain embodiments of the present invention. Embodiments of the present invention include a computer-implemented method, a computer program product executing a method and a computer system executing a method. In an embodiment of the present invention, a processor(s) of an LPCS receives, via a public computing system and a communication network, on behalf of a user of the public computer system, a request to use one or more computing resources belonging to the LPCS (310). In an embodiment of the present invention, wherein the user is not authorized to access the one or more resources by connecting to the LPCS directly. Alternatively, the public computer system may directly solicits usage from at least a substantial portion of the public, while the LPCS does not directly solicit usage from any substantial portion of the public.

Responsive to the request, the processor(s) determines a set of usage parameters defining a limit on usage of the one or more computing resources on behalf of the user (320). Specifically, these parameters may include a first usage limitation, with the first usage limitation including a first limitation type and first limitation value, and with the first usage limitation defining this limit on usage. In an embodiment of the present invention, the first limitation type includes one or more of: a processing power limitation, a storage limitation, a volatile memory limitation, a limit on number of physical machines, a limit on number of virtual machines, a limit on applications, a limit on number of communications, a time limitation, a limit on identities of devices allowed to communicate with the computing resource, and/or a limit on data volume in communications. This first usage limitation of the set of parameters may include one or more of the following: a Service Level Agreement associated with the one or more computing resources, quality criteria defining performance parameters of the one or more computing resources, and/or financial terms defining cost associated with utilization of the one or more computing resources by the public computing system.

The processor(s) receives, via the public computing system and the communication network, a workload of the user (330). Receiving the workload may entail the processor(s) obtaining, from the user, via the public computing system and the communication network, a custom image and the processor(s) installing the custom image to create the workload on the LPCS. Receiving the workload may also include the processor(s) copying an image from the public computing system, over the communication network and installing the image to create the workload on the LPCS. The processor identifies the image for copying based on metadata associated with the image indicating a user designation.

The processor(s) processes the workload and the processing includes the processor(s) limiting, by machine logic, usage of the one or more computing resources, on behalf of the user, in accordance with the usage parameters (340). In an embodiment of the present invention, the usage on behalf of the processing of the workload is performed in a manner such that the user is not made aware that the user has used the one or more computing resources.

In an embodiment of the present invention, the set of usage parameters also include a second usage limitation defining connectivity information for the public computing system to utilize when connecting to the LPCS for processing the workload. In this embodiment, the processor(s) transmits the second usage limitation to the public computing system. Thus, when the processor(s) in LPCS receives the workload, it also receives the connectivity information and authorizes the one or more computing resources to process the workload. In an embodiment of the present invention, based on also receiving the connectivity information, the processor(s) establishes, based on the connectivity information, a data communication connection for use by the user to connect to the one or more computing resources, through the public computing system. This data connection may include, but is not limited to, a virtual private network and/or virtual local area network spanning. Meanwhile, the connectivity information may include, but is not limited to, user authentication scheme information, application program interface call information, image repository link information, and/or characteristics information and network information associated with the computing resource.

In an embodiment of the present invention, the set of usage parameters include a second usage limitation that identifies specific resources in the LPCS. Specifically, the second usage limitation identifies at least one specific resource in the LPCS that corresponds to a portion of the one or more resources in the request. When the processor processes the workload (340), it utilizes this specific resource to process a portion of the workload.

Figure 4:
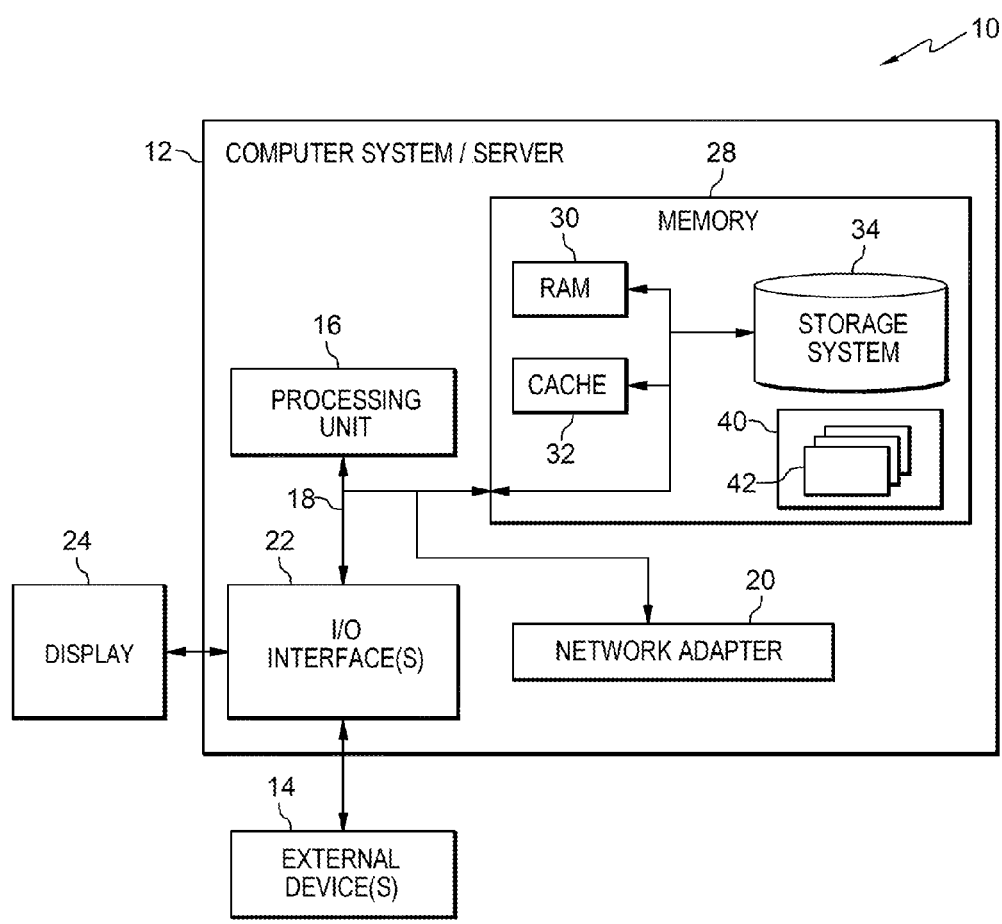
FIG. 4 depicts one embodiment of a computing node that can be utilized in a cloud computing environment.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the controller of the second computing system can be understood as cloud computing node 10 (FIG. 3) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
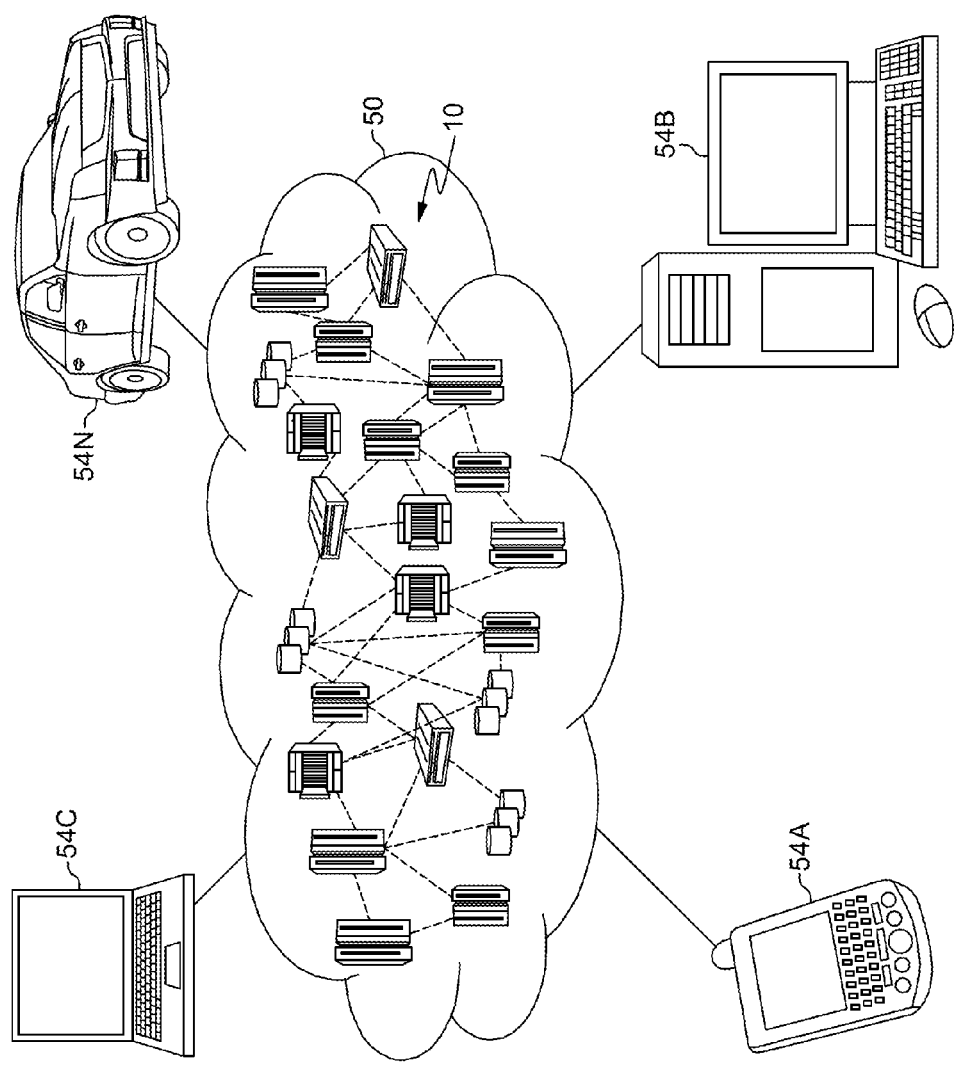
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
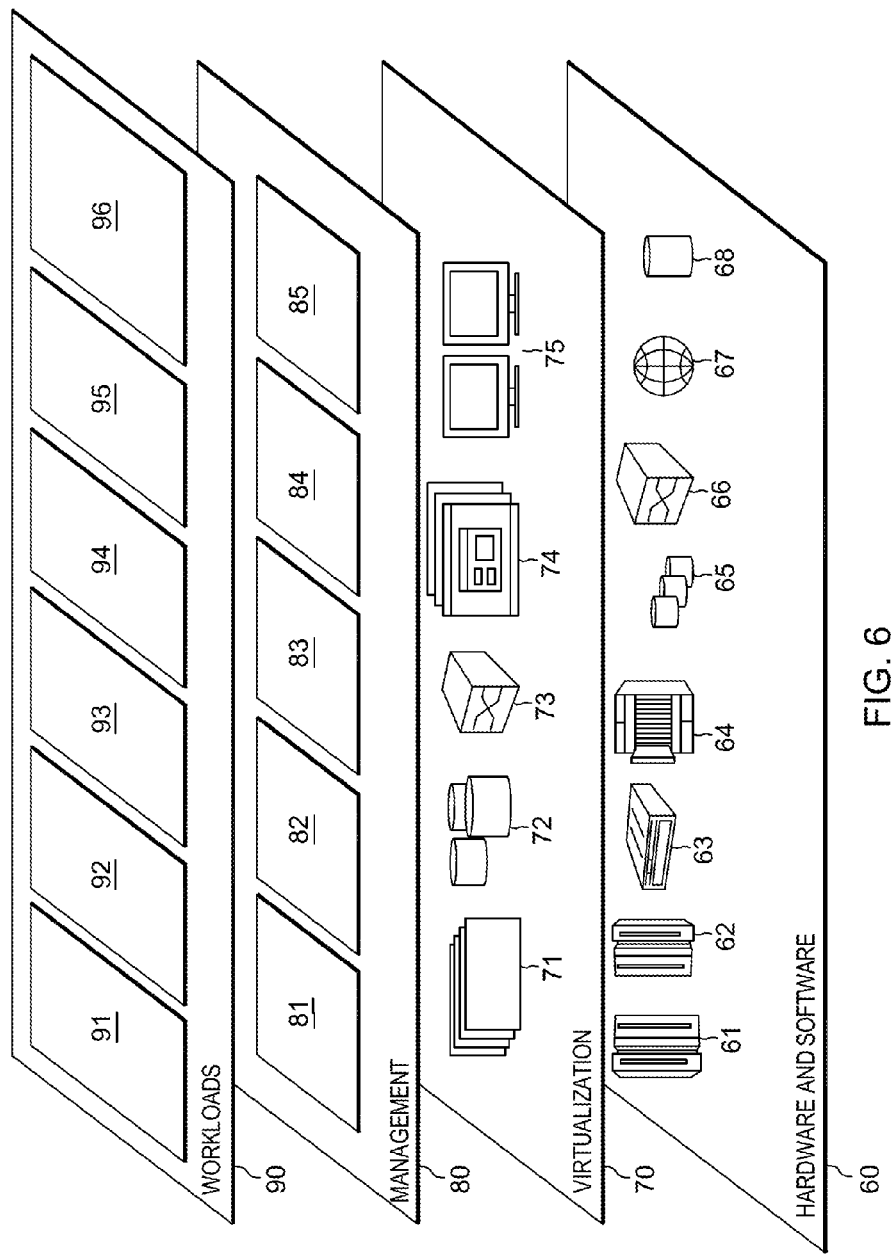
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and initiating and/or providing access to dedicated cloud computing resources 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, via a public computing system and a communication network, on behalf of a user of the public computer system, by one or more processors of a local/private computing system (LPCS), a request to use one or more computing resources belonging to the LPCS;
responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user, wherein the usage on behalf of the processing of the workload is performed in a way that the user is not made aware that the user has used the one or more computing resources, and wherein the set of usage parameters further comprise a second usage limitation defining connectivity information for the public computing system to utilize when connecting to the LPCS for processing the workload;
transmitting, by the one or more processors, to the public computing system, the second usage limitation;
receiving, via the public computing system and the communication network, by the one or more processors, a workload of the user; and
processing, by the one or more processors, the workload, wherein the processing comprises limiting, by machine logic, usage of the one or more computing resources, on behalf of the user, in accordance with the usage parameters.

2. The computer-implemented method of claim 1, wherein the first limitation type is selected from the group consisting of: a processing power limitation, a storage limitation, a volatile memory limitation, a limit on number of physical machines, a limit on number of virtual machines, a limit on applications, a limit on number of communications, a time limitation, a limit on identities of devices allowed to communicate with the one or more computing resources, and a limit on data volume in communications.

3. The computer-implemented method of claim 1, wherein the public computer system directly solicits usage from at least a substantial portion of the public, and the LPCS does not directly solicit usage from any substantial portion of the public.

4. The computer-implemented method of claim 1, wherein the user is not authorized to access the one or more resources by connecting to the LPCS directly.

5. The computer-implemented method of claim 1, wherein the receiving further comprises:
   receiving, via the public computing system and the communication network, by the one or more processors, the connectivity information; and
   authorizing, by the one or more processors, the one or more computing resources to process the workload.

6. The computer-implemented method of claim 5, further comprising:
   establishing, by the one or more processors, based on the connectivity information, a data communication connection for use by the user to connect to the one or more computing resources through the public computing system.

7. The computer-implemented method of claim 6, wherein the data communication connection is selected from the group consisting of: a virtual private network and virtual local area network spanning.

8. The computer-implemented method of claim 6, wherein the connectivity information is selected from the group consisting of: user authentication scheme information, application program interface call information, image repository link information, and characteristics information and network information associated with the one or more computing resources.

9. The computer-implemented method of claim 1, wherein receiving a workload of the user comprises:
   obtaining, by the one or more processors, from the user, via the public computing system and the communication network, a custom image; and
   installing, by the one or more processors, the custom image to create the workload on the LPCS.

10. The computer-implemented method of claim 1, wherein receiving a workload of the user comprises:
    copying, by the one or more processors, from the public computing system, over the communication network, an image, based on metadata associated with the image indicating a designation of the image by the user; and
    installing, by the one or more processors, the image to create the workload on the LPCS.

11. The computer-implemented method of claim 1, wherein the first usage limitation is selected from the group consisting of: a Service Level Agreement associated with the one or more computing resources, quality criteria defining performance parameters of the one or more computing resources, and financial terms defining cost associated with utilization of the one or more computing resources by the public computing system.

12. The computer-implemented method of claim 1, wherein the set of usage parameters further comprise a second usage limitation, the second usage limitation identifying at least one specific resource in the LPCS that corresponds to a portion of the one or more resources in the request, and wherein the processing comprises utilizing the at least one specific resource to process a portion of the workload.

13. A computer program product comprising:
    a computer readable storage medium readable by one or more processor and storing instructions for execution by the one or more processor for performing a method comprising:
       receiving, via a public computing system and a communication network, on behalf of a user of the public computer system, by one or more processors of a local/private computing system (LPCS), a request to use one or more computing resources belonging to the LPCS;
       responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user, wherein the usage on behalf of the processing of the workload is performed in a way that the user is not made aware that the user has used the one or more computing resources, and wherein the set of usage parameters further comprise a second usage limitation defining connectivity information for the public computing system to utilize when connecting to the LPCS for processing the workload;
       transmitting, by the one or more processors, to the public computing system, the second usage limitation;
       receiving, via the public computing system and the communication network, by the one or more processors, a workload of the user; and
       processing, by the one or more processors, the workload, wherein the processing comprises limiting, by machine logic, usage of the one or more computing resources, on behalf of the user, in accordance with the usage parameters.

14. The computer program product of claim 13, wherein the first limitation type is selected from the group consisting of: a processing power limitation, a storage limitation, a volatile memory limitation, a limit on number of physical machines, a limit on number of virtual machines, a limit on applications, a limit on number of communications, a time limitation, a limit on identities of devices allowed to communicate with the one or more computing resources, and a limit on data volume in communications.

15. The computer program product of claim 13, wherein the public computer system directly solicits usage from at least a substantial portion of the public, and the LPCS does not directly solicit usage from any substantial portion of the public.

16. A system comprising:
    a memory;
    one or more processors in communication with the memory; and
    program instructions executable by the one or more processors via the memory to perform a method, the method comprising:
       receiving, via a public computing system and a communication network, on behalf of a user of the public computer system, by one or more processors of a local/private computing system (LPCS), a request to use one or more computing resources belonging to the LPCS;

responsive to the request, determining, by the one or more processors, a set of usage parameters comprising a first usage limitation, with the first usage limitation including a first limitation type and first limitation value, and with the first usage limitation defining a limit on usage of the one or more computing resources on behalf of the user, wherein the usage on behalf of the processing of the workload is performed in a way that the user is not made aware that the user has used the one or more computing resources, and wherein the set of usage parameters further comprise a second usage limitation defining connectivity information for the public computing system to utilize when connecting to the LPCS for processing the workload;

transmitting, by the one or more processors, to the public computing system, the second usage limitation;

receiving, via the public computing system and the communication network, by the one or more processors, a workload of the user; and processing, by the one or more processors, the workload, wherein the processing comprises limiting, by machine logic, usage of the one or more computing resources, on behalf of the user, in accordance with the usage parameters.

* * * * *